Sept. 15, 1959   V. LOMBARDO   2,904,344
BABY CARRIAGE, SELF-ROCKING TYPE
Filed March 27, 1958

VINCENT LOMBARDO INVENTOR
BY G. J. De Angelo ATTORNEY 2,904,344
Patented Sept. 15, 1959

2,904,344
BABY CARRIAGE, SELF-ROCKING TYPE
Vincent Lombardo, Brooklyn, N.Y.

Application March 27, 1958, Serial No. 724,465

3 Claims. (Cl. 280—47.1)

This invention relates in general to sleep inducing and relaxing devices and more particularly to baby carriages and like wheeled vehicles, which are of the self-rocking type.

It is a commonly held belief that babies in their pre-natal environment become conditioned to the smooth, gentle, restful, undulating motion provided by nature and upon their birth continue to enjoy similar motion, finding it relaxing and inducive to sleep.

It is, therefore, an object of the invention to provide a baby carriage which is capable of automatically imparting to its occupant, as the baby carriage is wheeled along, a rocking motion which is gentle and of maximum smoothness and restfulness.

It is another object of the invention to provide a baby carriage having mechanism, whereby the body portion of the carriage is caused to rock and oscillate automatically in a longitudinal direction relative to the frame, as the carriage is wheeled along.

A further object of the invention is to provide means whereby said mechanism is rendered inoperative at the will of the user.

Figure 1:
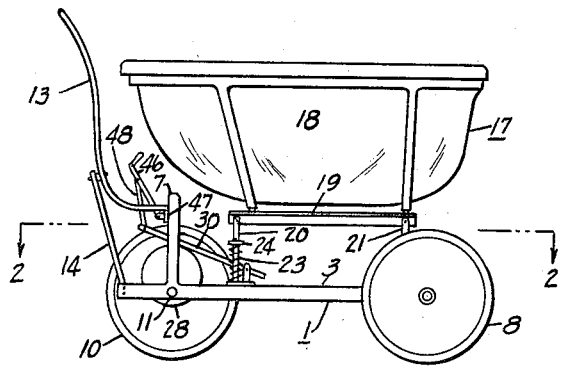
Figure 1 is a simplified schematic view in elevation of a baby carriage with portions broken away.
Figure 2:
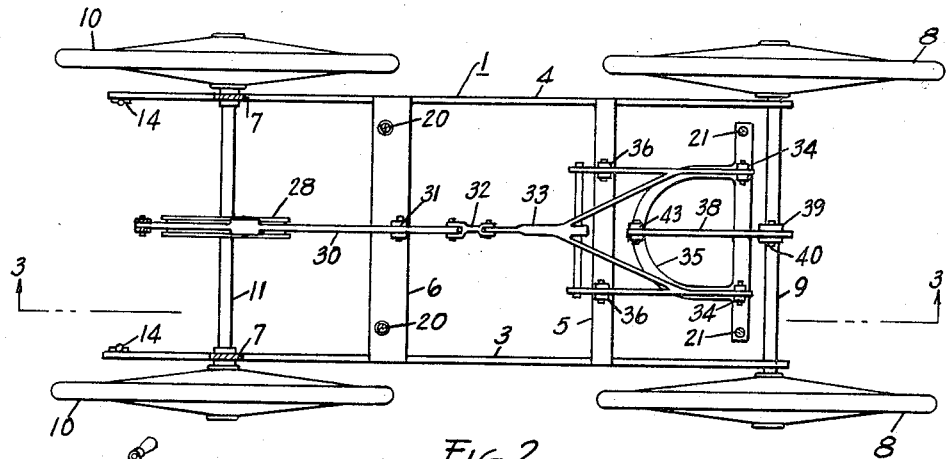
Figure 2 is a sectional plan view taken approximately along line 2—2 of Figure 1.
Figure 3:
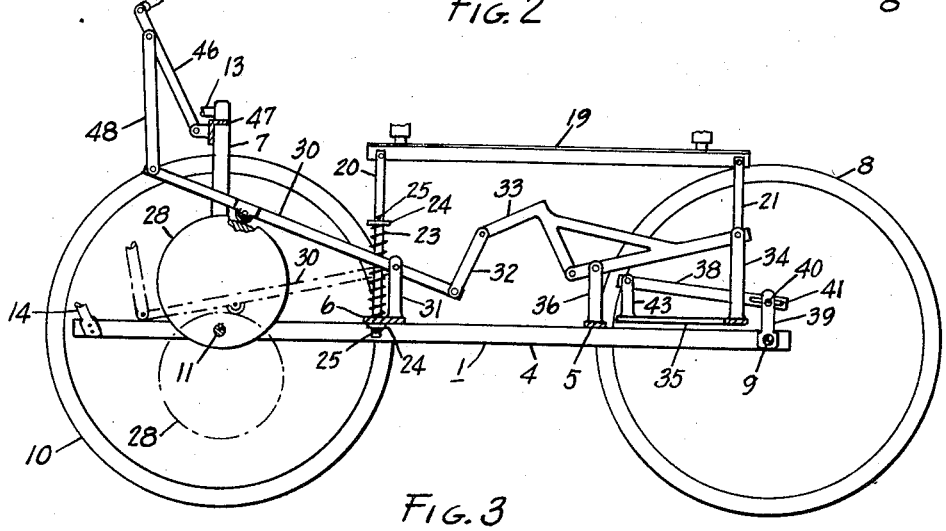
Figure 3 is a sectional view taken approximately along line 3—3 of Figure 2.

With reference to the drawings, the baby carriage comprises a frame 1 consisting of a pair of parallel longitudinal bars 3 and 4 separated from each other by a pair of spaced members 5 and 6 extending transversely to the longitudinal bars 3 and 4 and welded thereto. Each of the longitudinal bars 3 and 4 has a vertical member 7 protruding upwardly from its rear portion.

The frame 1 is supported upon a pair of front wheels 8 rotatably mounted on the ends of front axle 9 and upon a pair of rear wheels 10 which are rigidly secured to the ends of rear axle 11. Front axle 9 is rigidly secured to longitudinal bars 3 and 4. Rear axle 11 is journaled to longitudinal bars 3 and 4 for rotating movement relative thereto as the rear wheels 10 turn.

An upwardly extending handle 13 is rigidly attached to vertical members 7 at the rear of frame 1 and is further secured in position by braces 14 connecting the handle 13 to longitudinal bars 3 and 4.

A baby container 17 consisting of a substantially rectangular baby receiving receptacle 18 of flexible material such as cloth and a supporting frame 19 is pivotably secured to the uppermost ends of two pairs of vertical connecting rods 20 and 21.

The other ends of connecting rods 20 are each fitted into an oversized hole formed in transverse frame member 6 and are secured yieldably thereto by means of springs 23, spring collars 24 and pins 25.

The driving mechanism which imparts rocking motion to baby container 17 comprises a cam 28 secured to the center of rear axle 11 for rotating movement therewith as the rear wheels 10 rotate. As cam 28 rotates it engages and imparts an up and down motion to cam follower arm 30, which arm 30 is pivoted intermediate its ends on a vertical member 31. Vertical member 31 is rigidly secured to and protrudes upwardly from the center of transverse member 6. Cam 28 and cam follower 30 are shown in two positions. One end of cam follower 30 is connected through linkage 32 and 33 to two vertical members 34 extending upwardly from and rigidly secured to horizontal member 35. Linkage arm 33 is pivoted intermediate its ends on two vertical members 36 extending upwardly from and rigidly secured to transverse member 5. A lever 38 is slidably connected to a vertical member 39 protruding upwardly from and rigidly secured to the center of front axle 9. Pin 40 extending through vertical member 39 and a slot 41 defined in one end of lever 38 slidably secures that end to member 39. The other end of member 38 is pivotably connected to a vertical member 43 protruding upwardly from and rigidly secured to horizontal member 35. The lower ends of connecting rods 21 are also rigidly secured to horizontal member 35.

An engaging handle 46 is pivotably secured to a transverse member 47, which member 47 is secured at each end to vertical frame member 7. Lever 48 is pivotably secured at one end to handle 46 and at the other end to cam follower 30. By moving handle 46 upwardly into an approximately vertical position lever 48 is effective to disengage cam follower 30 from cam 28 when desired.

Assume that engaging handle 46 is placed in a substantially horizontal position so that cam follower 30 engages cam 28. As the carriage is wheeled either forwards or backwards, rear wheels 10 and rear axle 11 rotate. Cam 28, which is secured to rear axle 11, also rotates causing cam follower 30 to move up and down about its fulcrum.

As cam follower 30 moves up and down, linkage 32 and 33 imparts an up and down motion to horizontal member 35 moving this member from a position above longitudinal bars 3 and 4 to a position below longitudinal bars 3 and 4. However, lever 38, pivotably connected to vertical member 43, which member 43 is in turn rigidly attached to the rearmost portion of horizontal member 35, limits the up and down movement of the rearmost portion of horizontal member 35, causing the front portion of member 35 to scribe an arc in the vertical plane under the influence of linkage 32 and 33. Connecting rods 21, which are rigidly secured at one end to the front portion of horizontal member 35, are in turn also moved up and down, the arcuate travel of the front portion of horizontal member 35 transmitting an oscillatory motion in a longitudinal direction to rods 21. This up and down motion is transmitted to the forward portion of baby container 17, which container is pivotably connected to connecting rods 20 at its rear portion. Since connecting rods 21 also oscillate in a longitudinal direction and since baby container 17 is yieldably supported on transverse frame member 6 by means of connecting rods 20 extending through oversize holes in frame member 6 and by springs 23 and spring collars 24, baby container 17 is actuated backwards and forwards as its front portion moves up and down. The baby container 17 is thus rocked in a longitudinal direction gently and smoothly.

This rocking motion is amplified and made even more gentle by baby receiving receptacle 18 which is made of flexible material; the bottom portion of baby receiving receptacle 18 swinging freely as supporting frame 19 rocks.

It may be noted, that both cam follower 30 and linkage 32 and 33 are positioned in a longitudinally extending direction to take advantage of the longest dimension of the carriage, so that both are of maximum length insuring the minimum expenditure of energy by the propellant to actuate the driving mechanism and obtaining the largest possible arcuate travel of horizontal member 35 for maximum smoothness of the rocking motion imparted to the baby container 17.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A self-rocking baby carriage, pushcart or like vehicle comprising, a first frame supported on front and rear wheels, a propelling handle rigidly secured to said first frame, a container including an upwardly open receptacle of flexible material suspended on a supporting frame, a pair of vertical connecting rods yieldably mounted on the rear portion of said first frame and loosely pivoted to the rear portion of said supporting frame, supporting means yieldably supporting the front portion of said supporting frame on the front portion of said first frame, first connecting means operatively connecting said supporting means to said rear wheels effecting movement of said container relative to said first frame about an axis transverse to said first frame upon rolling movement of said rear wheels, an engaging handle pivotably secured to said first frame, and second connecting means operatively connecting said engaging handle to said first connecting means and operable upon movement of said engaging handle relative to said first frame to disengage said first connecting means from said rear wheels.

2. A self-rocking baby carriage, pushcart or like vehicle comprising, a frame, a propelling handle for said vehicle rigidly attached to the rearmost portion of said frame, a front axle rigidly secured to said frame, said front axle having front wheels rotatably secured adjacent the ends thereof, a rear axle rotatably secured to said frame, said rear axle having rear wheels rigidly secured adjacent the ends thereof for rotation of said axle relative to said frame upon rolling movement of said rear wheels upon a surface, a container, supporting means yieldably supporting said container on said frame, said container providing a substantially rectangular upwardly open baby receiving receptacle, a cam secured to said rear axle for rotating movement therewith upon rotation of said rear wheels, a cam follower arm pivoted intermediate its ends on said frame and adapted to engage said cam for oscillating movement in a vertical plane as said cam rotates, and linkage means connecting one end of said cam follower arm to said container supporting means for transmitting oscillatory movement to said container.

3. A self-rocking baby carriage, pushcart or like vehicle comprising, a frame, a propelling handle for said vehicle rigidly attached to the rearmost portion of said frame, a front axle rigidly secured to said frame, said front axle having front wheels rotatably secured adjacent the ends thereof, a rear axle rotatably secured to said frame, said rear axle having rear wheels rigidly secured adjacent the ends thereof for rotation of said axle relative to said frame upon rolling movement of said rear wheels upon a surface, a cam secured to said rear axle for rotating movement therewith as said rear wheels turn, a cam follower arm disposed longitudinally of said frame, said cam follower arm being pivoted intermediate its ends on said frame and being adapted to engage said cam, an engaging handle pivotably secured to said frame member, means operatively connecting said engaging handle to one end of said cam follower arm and operable upon movement of said engaging handle upwardly into a vertical position to disengage said cam follower arm from said cam, two vertical rear connecting rods, each having one end yieldably secured to said frame at the rear portion thereof, a horizontal member, a lever disposed longitudinally of said frame and having a slot defined in one end, a pin extending through said slot securing said one end of said lever to said frame, the other end of said lever being pivotably secured to said horizontal member, two vertical front connecting rods, each having one end rigidly secured to said horizontal member, a container pivotably mounted on the other ends of said rear and front vertical connecting rods, and linkage means connecting said horizontal member to the other end of said cam follower arm, whereby up and down motion imparted to said cam follower arm by said rotating cam as rear axle and rear wheels rotate is transmitted by said linkage means through said horizontal member to said front vertical connecting rods causing them to move up and down and oscillate in a longitudinal direction imparting rocking motion to said container.

References Cited in the file of this patent
UNITED STATES PATENTS

| | | |
|---|---|---|
| 732,426 | Murray | June 30, 1903 |
| 1,336,725 | Biwoin | Apr. 13, 1920 |
| 2,164,313 | Duarte | July 4, 1939 |
| 2,699,952 | Sebel | Jan. 18, 1955 |